Aug. 31, 1943.  E. P. WORTHEN  2,328,044
COMBINATION LOW PRESSURE FEED HEATER
Filed July 25, 1941   7 Sheets-Sheet 1

Inventor
*Eugene P. Worthen.*
By *R. S. C. Dougherty*
Attorney

Aug. 31, 1943.   E. P. WORTHEN   2,328,044
COMBINATION LOW PRESSURE FEED HEATER
Filed July 25, 1941   7 Sheets-Sheet 4

Inventor
*Eugene P. Worthen.*
By *R. S. C. Dougherty.*
Attorney

Aug. 31, 1943.　　　E. P. WORTHEN　　　2,328,044
COMBINATION LOW PRESSURE FEED HEATER
Filed July 25, 1941　　　7 Sheets-Sheet 5

Inventor
Eugene P. Worthen,
By R. S. C. Dougherty.
Attorney

Aug. 31, 1943.　　　E. P. WORTHEN　　　2,328,044
COMBINATION LOW PRESSURE FEED HEATER
Filed July 25, 1941　　　7 Sheets-Sheet 6
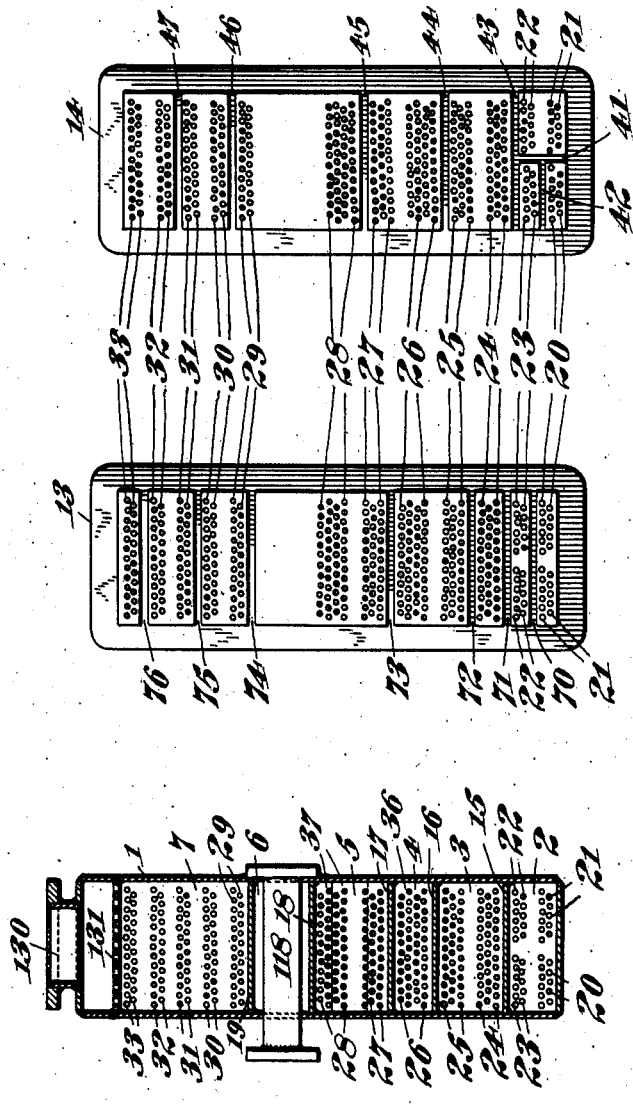
Inventor
*Eugene P. Worthen.*

Aug. 31, 1943.  E. P. WORTHEN  2,328,044
COMBINATION LOW PRESSURE FEED HEATER
Filed July 25, 1941  7 Sheets-Sheet 7
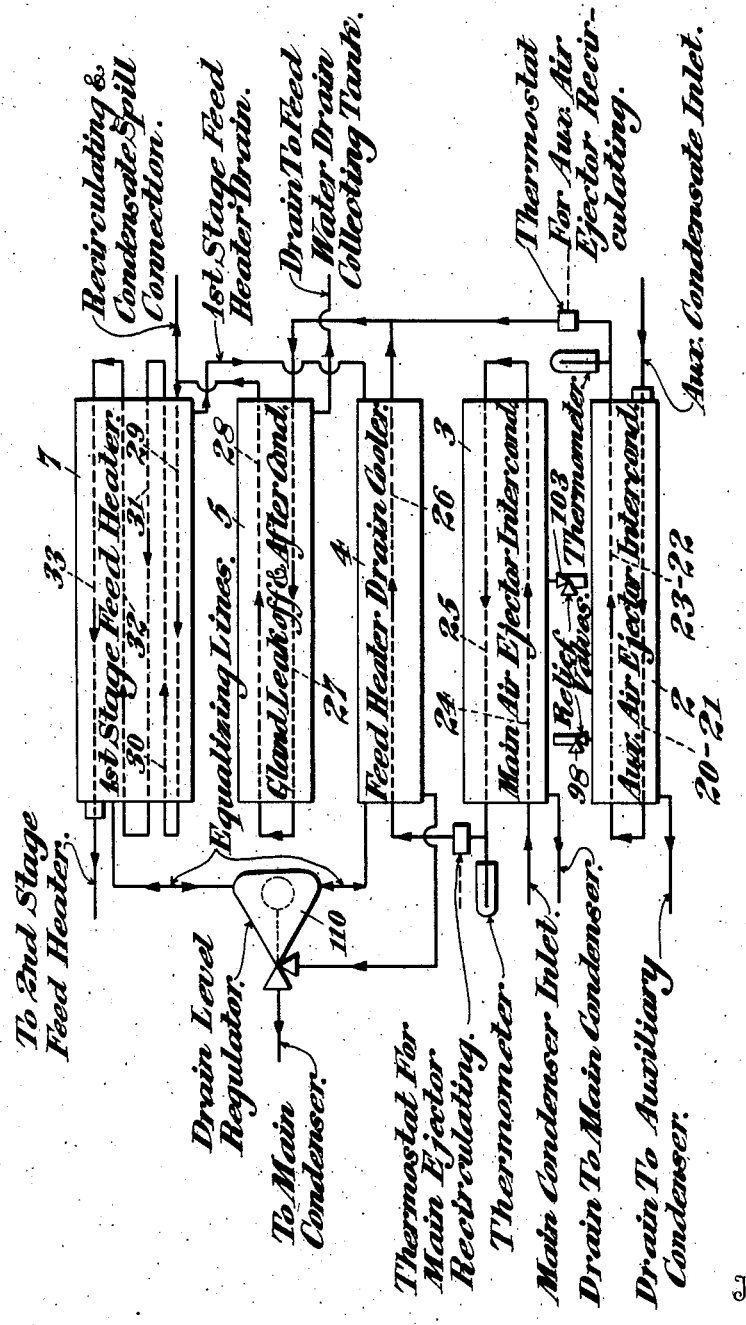

Patented Aug. 31, 1943

2,328,044

UNITED STATES PATENT OFFICE 2,328,044

COMBINATION LOW PRESSURE FEED HEATER

Eugene Porter Worthen, East Weymouth, Mass., assignor, by mesne assignments, to Buena Vista Iron Company, a corporation of New Jersey Application July 25, 1941, Serial No. 404,011

5 Claims. (Cl. 257—2)

This invention relates to a combined low pressure heater, and more particularly to a combined low pressure feed heater embodying in one unit a plurality of auxiliary heat exchangers suitable for marine use.

Modern high pressure steam plants with three or more stages of feed heating comprise usually a large number of individual heat exchangers, which in most cases include the following: (a) main air ejector inter and after condensers; (b) auxiliary air ejector inter and after condensers; (c) turbine gland leakoff condenser; (d) feed heater drain cooler; (e) first stage feed heater; (f) second stage deaerating heater; and (g) third stage feed heater. Each of these has its separate shell, heads, interconnecting piping, by-pass piping and valves, which are always expensive to furnish and maintain, and in marine installations particularly, are excessively wasteful of valuable space and weight. A great deal of heat escapes unused because of the exposure of broad radiating surfaces, thus requiring unnecessarily large expenditures for fuel and additional expense for insulating coverings. Also, it is sometimes a difficult proposition to keep a feed heater properly drained and dry, while completely flooding its drain cooler at the same time, yet both conditions are necessary for the most efficient operation.

One object of my invention is, therefore, to provide a closed type low pressure feed heater employing straight tubes and combining within a single shell first stage feed heater, combined gland leakoff condenser and main and auxiliary after condenser, feed heater drain cooler, and auxiliary air ejector intercondenser.

Another object is a combination low pressure unit which insures flooding the drain cooler while keeping the feed heater dry.

Another object is a cheaper and more compact heat exchange system with much less piping and fewer valves and other parts than conventional systems.

Still another object is a low pressure heat exchange system suitable and adapted for marine use.

Numerous other objects and advantages will be apparent from the following description, wherein reference is made to the accompanying seven sheets of drawings illustrating the invention and wherein like numerals of reference indicate like parts.

In Figs. 4, 6 and 7, it should be noted, the tubes are shown broken away in order to disclose the structure more plainly.

Fig. 8 is a section taken along the lines 8—8 of Fig. 4.

Fig. 9 is an end view of the outlet end tube sheet.

Fig. 10 is an end view of the return end tube sheet.

Fig. 11 is a functional diagram of the above apparatus showing by legends and arrows the course of the condensate therethrough.

Figure 1:
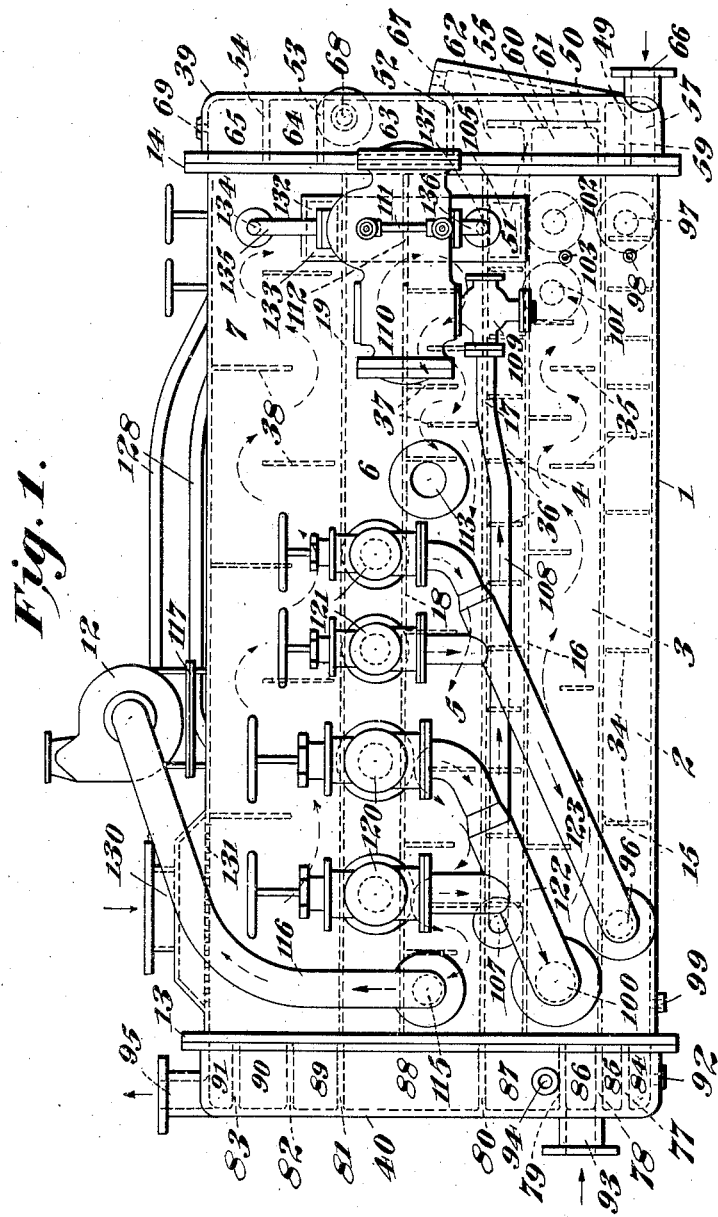
Figure 1 is a front elevation of the five-section unit.
Figure 2:
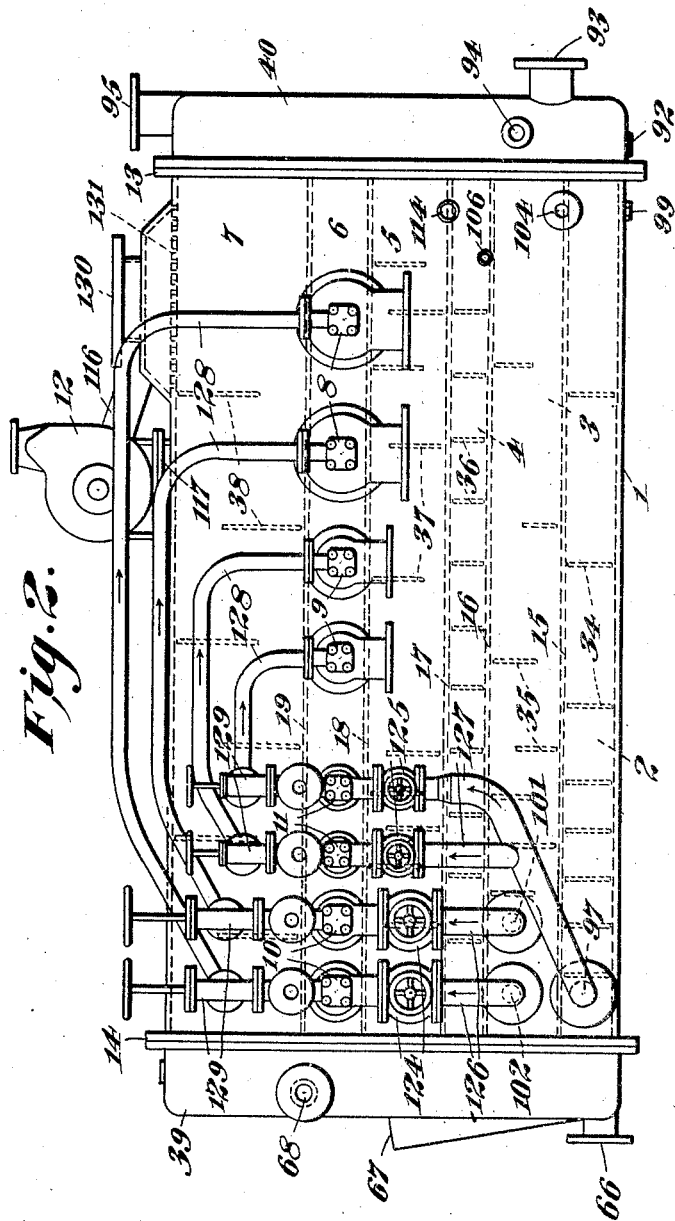
Fig. 2 is a rear elevation of said unit.
Figure 3:
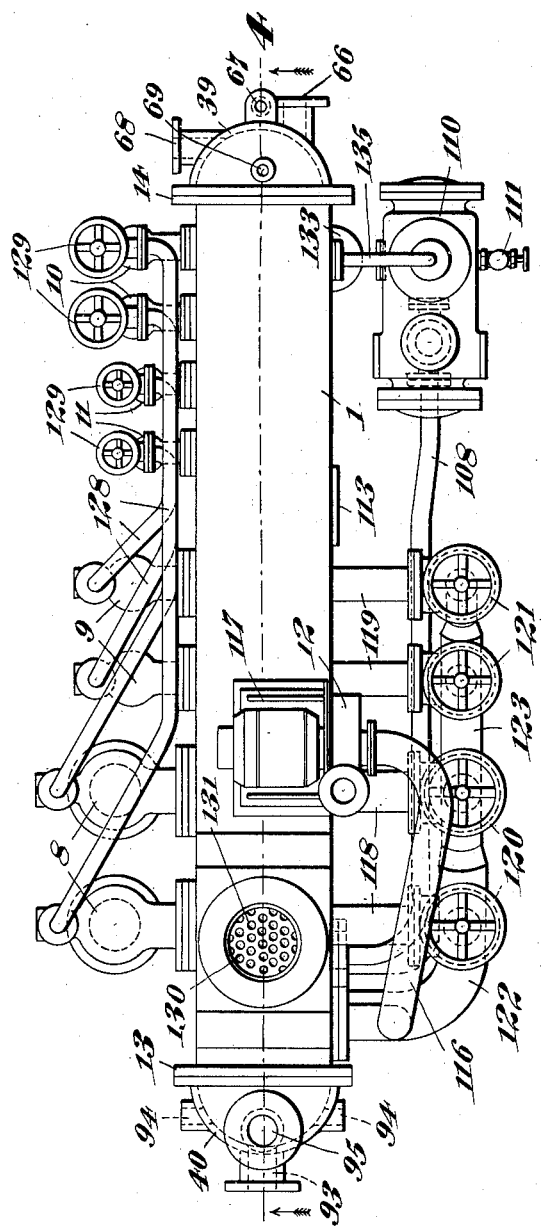
Fig. 3 is a top plan view thereof.
Figure 4:
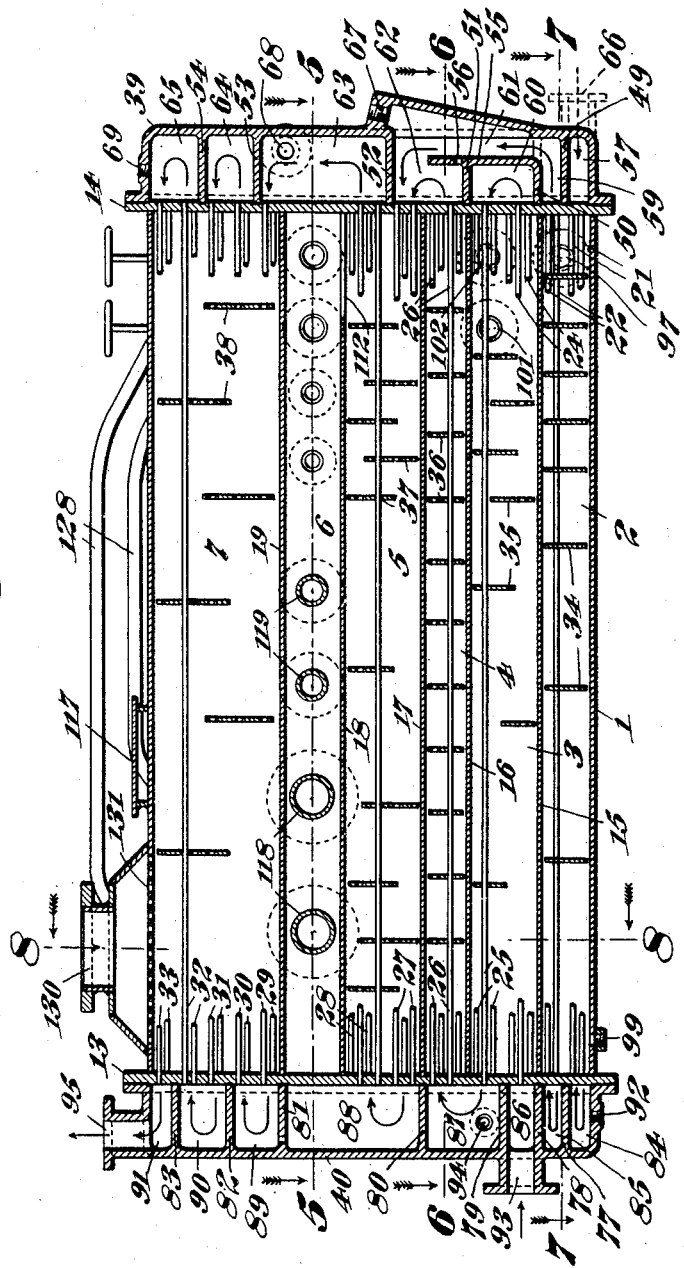
Fig. 4 is a sectional elevation through centerline 4—4 of Fig. 3.
Figure 5:
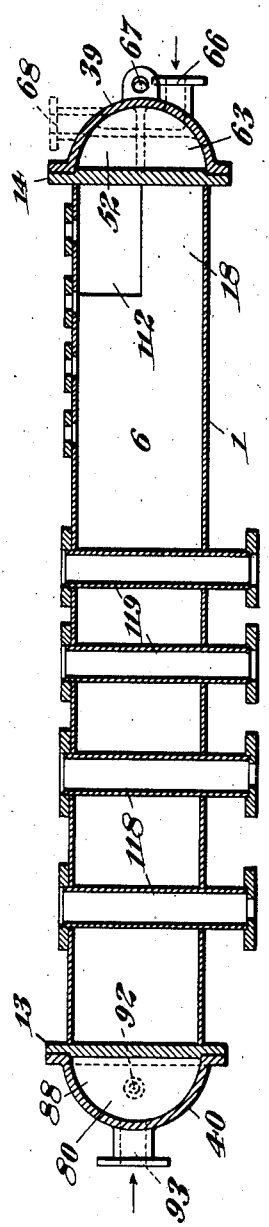
Fig. 5 is a section taken along the lines 5—5 of Fig. 4 and showing in detail the air ejector compartment.
Figure 6:
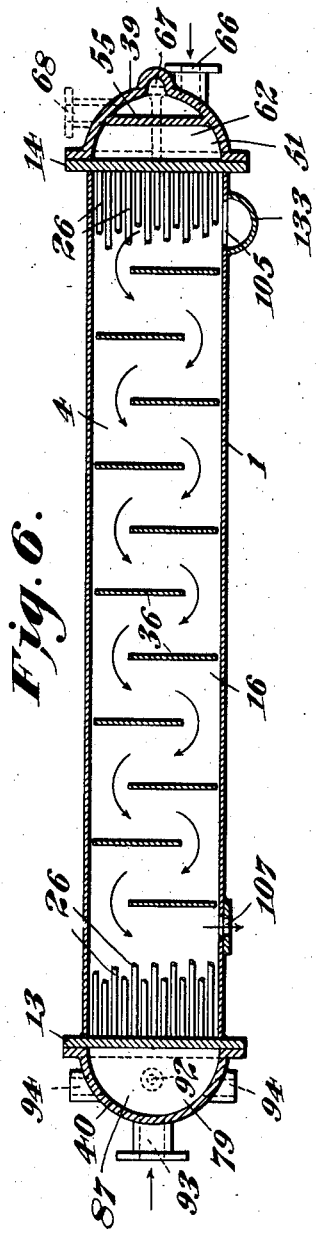
Fig. 6 is a section along the lines 6—6 of Fig. 4 showing the feed heater drain cooler.
Figure 7:
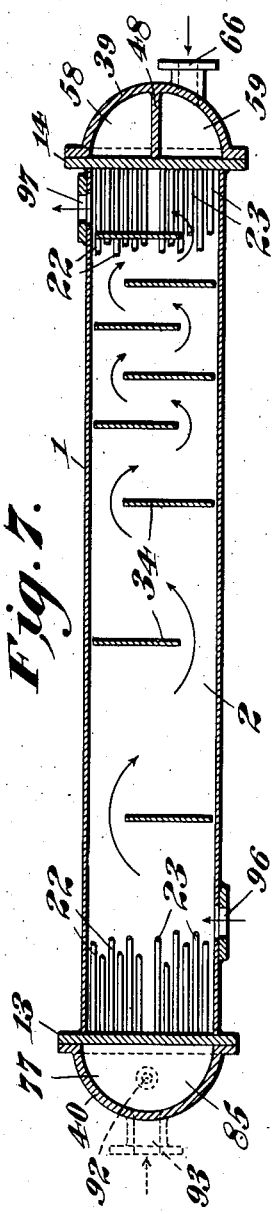
Fig. 7 is a section along the lines 7—7 of Fig. 4 showing the auxiliary air ejector intercondenser.

Referring now also to the drawings, Figs. 1 to 11, inclusive, show a closed type unit comprising within one shell 1 the auxiliary air ejector intercondenser 2, the main air ejector intercondenser 3, the feed heater drain cooler 4, the combined main and auxiliary after condenser and gland leakoff condenser 5, air ejector compartment 6, and the first stage feed heater 7, which are arranged from bottom to top within the shell in the order named. In addition flanged first and second stage main and auxiliary air ejectors 8, 9, 10 and 11, and motor-driven exhaust fan 12, with associated piping and valves are externally mounted on the unit.

The shell or casing 1 is constructed of welded steel plate, and preferably is rectangular in cross-section as shown, although it may be made in circular or other form if desired.

Outlet and return tube sheets 13 and 14 (Figs. 9 and 10) are welded to their respective ends of the shell 1, and horizontal division plates 15, 16, 17, 18 and 19 welded all around to the shell and to the tube sheets for pressure tightness separate the different sections of the unit. Since the condensing sections of the unit are required to operate under partial vacuum, the main and auxiliary intercondensers 2 and 3 and combined main and auxiliary air ejector after condenser and gland leakoff condenser 5 must be particularly tested and checked for tightness under pressure. Each individual tube in tube banks 20, 21, 22, 23, 24, 25, 26, 27, 28, 29, 30, 31, 32 and 33 is secured at one end by belling or the like into a tube sheet and packed with any suitable packing into the tube sheet at the other end to permit free expansion of shell and tubes. It is of course obvious that both ends may be packed if desired. Staggered vertical baffle-plates 34, 35, 36, 37 and 38 are welded as shown in each section except air ejector compartment 6, and are suitably perforated with slightly oversize and rounded edge holes to allow passage of the tubes therethrough without binding or chafing.

Return waterhead 39 and outlet waterhead 40 are bolted or otherwise secured to tube sheets 14 and 13 respectively. Grooved portions 41, 42, 43, 44, 45, 46 and 47 on tube sheet 14 and corresponding division walls 48, 49, 50, 51, 52, 53 and 54 and vertical by-pass plate 55 provided with drain outlet 56 in return waterhead 39 form chambers 57, 58, 59, 60, 61, 62, 63, 64 and 65. Said return waterhead 39 is also provided with auxiliary condensate inlet 66, tapped thermal unit connection 67, recirculating connection 68 and vent 69.

Grooved portions 70, 71, 72, 73, 74, 75 and 76 on tube sheet 13 and corresponding division walls 77, 78, 79, 80, 81, 82 and 83 in outlet waterhead 40 form chambers 84, 85, 86, 87, 88, 89, 90 and 91. Drain 92, main condensate inlet 93, tapped thermal unit connection 94, and combined condensate outlet 95 are also provided on said waterhead 40. The conventional combinations of thermostat and thermometer shown diagrammatically in Fig. 11 comprises the thermal units which screw into tapped connections 67 and 94.

The auxiliary air ejector intercondenser 2 is provided with port 96 for first stage air ejection and port 97 for second stage air ejection and with relief valve connection 98 and drain outlet 99. The main air ejector intercondenser 3 is similarly provided with port 100 for first stage air ejection and ports 101 and 102 for second stage air ejection and with relief valve connection 103 and drain outlet 104.

Feed heater drain cooler 4 is supplied with inlet port 105, clean out plug 106 and drain outlet 107 near opposite end thereof, said drain outlet 107 being connected by pipe 108 to throttle valve 109 attached to water level regulator 110 of any standard trap or float controlled type equipped with water glass 111, mounted on the side of the unit and connected by suitable piping to the main condenser (not shown).

The combined gland leakoff and main and auxiliary after condenser 5 is equipped with vapor inlet port 112 in division plate 18 at the top thereof, and with gland inlet port 113 centrally on one side and drain outlet 114 at the opposite end from inlet port 112. Adjacent to drain outlet 114 is gland exhaust port 115, which is connected by pipe 116 to exhaust fan 12 supported on foundation 117.

Through air ejector compartment 6 run parallel horizontal pairs of pipes 118 and 119 connecting on one side to first stage main and auxiliary air ejector 8 and 9 and on the other side connecting through angle valves 120 and 121 and pipes 122 and 123 to ports 100 and 96 on main and auxiliary air ejector intercondensers 3 and 2 respectively. The second stage pairs of main and auxiliary air ejectors 10 and 11, provided with gate valves 124 and 125, connect by pipes 126 and 127 to air ejection ports 102, 101 and 97 on said main and auxiliary air ejector intercondensers. Following conventional and familiar practice, steam is supplied to the air ejectors through suitable piping 128 and regulated by valves 129.

The advantage of having the discharge of the first stage ejectors pass through the casing of the air ejector compartment 6 is primarily one of compactness. For best utilization of space the various pipes and valves are arranged on both side walls of the casing; and it is necessary to connect the discharge from the first stage main and auxiliary air ejectors 8 and 9 on one side to the pipes 122 and 123 leading to the main and auxiliary intercondensers 3 and 2 on the other. By leading the connecting pipes 118 and 119 through the air ejector compartment 6 the construction utilizes available space not otherwise used; and avoids increasing the dimensions of the complete unit which would occur if these connecting pipes were led, say, above or below the outside of the casing.

In the top of shell 1 at one end of first stage feed heater 7 is located bleeder steam port 130 with perforated inlet plate 131 in the bottom opening thereof. Drain outlet 132 in the side of shell 1 at the other end of said feed heater 7 connects to half-pipe 133 welded to the outside of said shell 1 which half-pipe in turn connects to port 105 of the drain cooler 4. Port 134 connects by pipe 135 to drain regulator 110, which in turn connects by pipe 136 to port 137 in said half-pipe.

In operation, the combined unit receives condensate directly from the main and auxiliary condensate pumps (not shown), directs the flow of condensate in proper sequence through the passes of the tube banks, and discharges to the second stage deaerating feed heater (also not shown). Condensate from the main condenser enters inlet 93 in waterhead 40 and condensate from the auxiliary or dynamo condenser enters inlet 66 in opposite waterhead 39. The main condensate flows through tube banks 24 and 25 of the main air ejector intercondenser 3 and the single bank 26 of the feed heater drain cooler 4 while the auxiliary condensate flows through the banks 20, 21, 22 and 23 of the auxiliary air ejector intercondenser 2 and by-passes the main air ejector intercondenser 3 and drain cooler 4 by means of vertical by-pass plate 55 in return waterhead 39 to combine with the main condensate in chamber 62 in said waterhead 39 at the entrance to the first pass of the combined main and auxiliary air ejector and gland leakoff condenser 5. The total condensate then flows through the two tube passes 27 and 28 of that section and the five passes 29, 30, 31, 32 and 33 of the first stage feed heater 7 to combined condensate outlet 95 in outlet waterhead 40.

The feed heater section 7 of the combined unit receives heating steam from the bleeder on the low pressure turbine (not shown) which at full power will maintain a pressure in the heater shell of about 8.5 pounds per square inch absolute. Steam enters by port 130 through perforated inlet plate 131 designed to prevent direct impingement of high velocity steam or water upon the tubes therein, and then is directed several times across the said tubes by internal vertical baffle-plates 38. Feed heater drains are conducted by drain outlet 132 through half-pipe 133 to inlet port 105 opening into drain cooler 4. After traversing the passes of the baffle plates 36 in the said drain cooler, the cooled drains are discharged to the main condenser (not shown) through float-controlled drain level regulator 110 and throttle valve 109 mounted on the side of the unit and arranged to maintain a level of drains in half-pipe 133 approximately midway between feed heater 7 and drain cooler 4, as shown by water glass 111, thereby keeping feed heater 7 free of drains and drain cooler 4 full of same at all times.

First stage main and auxiliary air ejectors 8 and 9 take suction from their respective condensers (not shown), and discharge into horizontal pairs of pipes 118 and 119 respectively running through air ejector compartment 6 to the opposite side of the shell where the discharge is regulated by angle valves 120 and 121 on pipes 122 and 123 leading to ports 100 and 96 on the main and auxiliary air ejector intercondensers 3 and 2 respectively.

Second stage main and auxiliary air ejectors 10 and 11 take suction from ports 101, 102 and 97 on their respective intercondensers 3 and 2 through external pipes 126 and 127 fitted with gate valves 124 and 125, and discharge into air ejector compartment 6 which serves as an entrance chamber to the combined gland leakoff and air ejector after condenser 5. Connection between this entrance chamber and the abovementioned condenser is through port 112, at one end of the division plate 18 separating these two compartments; and the provision of an air ejector compartment separate from the condenser compartment is an effective way to lead the steam into the condenser at the proper point for most efficient use.

The air and vapor mixture from the air ejectors then makes five passes across the tubes 27 and 28 through the baffle-plates 37 in said gland leakoff and air ejector after condenser 5, before combining with the vapors from the turbine glands (not shown), which enter through gland inlet port 113 in the side of shell 1. The combined vapors then traverse the remaining six passes through said baffle-plates 37 to exhaust port 115 at the other end, where the mixture, principally air at that point, is withdrawn through pipe 116 by exhaust fan 12 and discharged to atmosphere.

The separation of air and vapor from the condensate in the combined gland leakoff and air ejector after condenser 5 is by gravity. The baffle-plates provided in the condenser compartment constrain the steam and air to flow across the tubes a number of times so as to produce efficient condensation. The drops of water fall to the bottom of the compartment and are drained off through the outlet 114. The air, and so much of the vapor as is not condensed, are discharged to atmosphere by the fan suction through port 115.

Drains from the main and auxiliary air ejector intercondensers 3 and 2 and combined air ejector after condenser and gland leakoff condenser 5 flow from drain outlets 104, 99 and 114 through suitable pipes to the fresh water drain collecting tank (not shown). In each case parallel flow of drains and vapor is effected by locating the drain outlet thereof at the opposite end from the vapor inlet.

At low power, with small quantities of condensate available, provision is made for maintaining sufficiently low temperature, i. e., under 120° F., in the combined air ejector after condenser and gland leakoff condenser 5, to condense efficiently the vapors coming from turbine glands and air ejectors as aforesaid by recirculating part of the condensate from the last pass of the combined gland leakoff and air ejector intercondenser 5 through connection 68 to either the main or the dynamo condensers.

The amount of such recirculation is controlled by the temperature of condensate leaving the main and the auxiliary air ejector intercondensers 3 and 2 respectively by the thermostats in the thermal units located at 67 and 94 in the waterheads, which are set to operate at about 120° F. Although the recirculated condensate passes through the drain cooler 4 ahead of the combined gland leakoff and air ejector after condenser 5 there is little or no heating of the condensate in the drain cooler 4 at low power because under that condition the steam supplied to the first stage feed heater 7 from the bleeder on the low pressure turbine is at very nearly the same temperature and pressure as the exhaust to the main condenser and hence the drains going to the drain cooler 4 from the first stage heater 7 are only slightly above the temperature of the condensate leaving the condenser. The condensate entering the drain cooler may be at the same or even higher temperature than the drains since at that point it has already received some heat from the air ejector intercondensers.

Under port conditions with the main turbine shut down, the unit is left in the feed circuit, the condensate from the dynamo condenser then serving to condense the vapors from the auxiliary air ejectors and from the generator turbine glands. The feed heater 7 and drain cooler 4 as well as the main air ejector intercondenser 3 are inoperative under those conditions.

Should it become necessary to shut down the unit for repairs the condensate may be bypassed to the second stage deaerating heater, though with some loss in over-all efficiency. During the shut-down period the vapor from the turbine glands will be discharged to the engine room. A standby single stage air ejector which discharges to atmosphere will maintain a vacuum of approximately 26 inches in the main or dynamo condensers without difficulty. If the shut-down is made under port conditions there will be only the negligible amount of vapor from the dynamo turbine to be discharged to the engine room and a negligible loss in efficiency.

The above-described unit has very obvious advantages in the way of compactness and efficiency, but it of course requires engine room space appropriate to its shape and dimensions. Where two or more somewhat small or irregular spaces rather than one fairly large and regular space are available, or where for any other reason more than one unit is deemed desirable, separate main and auxiliary inter and after condensers of any conventional type may be utilized with the modified three-section unit shown in my divisional application, Serial No. 452,445, filed July 27, 1942, as another form of my invention.

Although I have thus described my invention in considerable detail, I desire it to be clearly understood that I reserve the right to use such substitutions, modifications, or equivalents thereof as are embraced within the scope and spirit of my invention, as defined in the appended claims.

Having thus described my invention what I claim as new and useful and desire to secure by Letters Patent is:

1. A combined feed heater unit comprising a main inlet port for receiving main condensate, an auxiliary inlet port for receiving auxiliary condensate, a main air ejector intercondenser having tube passes and a feed heater drain cooler having a tube pass for the flow of main condensate, an auxiliary air ejector intercondenser having tube passes for the flow of auxiliary condensate, a vertical by-pass plate closing one end of the main air ejector intercondenser and partially closing an end of the drain cooler for bypassing auxiliary condensate around the main air ejector intercondenser and the drain cooler, a chamber wherein the main and auxiliary condensates combine, a combined air ejector after condenser and gland leakoff condenser having tube passes for the flow of the combined condensate, a first stage feed heater having tube passes for the flow and heating of said combined condensate, and an outlet port for discharging the heated combined condensate.

2. A combined unit having straight tubes for the passage of condensate and comprising a single enclosing shell, a feed heater section therein, an inlet connection for admitting steam thereto to heat the condensate, an air ejector compartment beneath the feed heater for receiving steam ejected from a separate source, a combined air ejector after condenser and gland leakoff condenser beneath the air ejector compartment for receiving and condensing steam from the air ejector compartment, a drain cooler thereunder for receiving and cooling drains from steam condensed in the feed heater section, a main air ejector intercondenser beneath the drain cooler through which main condensate passes to said drain cooler, an auxiliary air ejector intercondenser beneath the main air ejector intercondenser through which auxiliary condensate passes to combine with the main condensate at the entrance to the combined air ejector after condenser and gland leakoff condenser, means for conducting drains from steam condensing in the feed heater from the feed heater to the drain cooler, and means for controlling the discharge of drains from the drain cooler in response to the level of the drains in the conducting means.

3. In a multi-stage steam plant including separate main and auxiliary condensers, turbine glands, and fresh water drain collecting tank, the combination in a feed heater unit with an air ejector compartment, main and auxiliary intercondensers, and combined air ejector after condenser and gland leakoff condenser, of a plurality of first stage main and auxiliary air ejectors for receiving air and vapor mixtures from the main and auxiliary condensers respectively, separate means for carrying said mixtures through the air ejector compartment, separate means for conducting said mixtures to main and auxiliary intercondensers respectively, separate second stage main and auxiliary air ejectors for receiving said mixtures from the main and auxiliary intercondensers and injecting same for commingling in the air ejector compartment, means for discharging the commingled mixture into the combined air ejector after condenser and gland leakoff condenser, means for admitting air and vapor from the turbine glands to join the previously commingled air and vapor mixture, an outlet for discharging the condensate and a separate outlet for discharging the air and vapor from the combined air ejector after condenser and gland leakoff condenser.

4. In a multi-stage steam plant including separate main and auxiliary condensers, turbine glands, and fresh water drain collecting tank, the combination in a low pressure feed heater unit with an air ejector compartment, main and auxiliary intercondensers, and combined air ejector after condenser and gland leakoff condenser, of a pair of first stage main air ejectors for receiving main air and vapor mixture from the main condenser, parallel horizontal pipes for carrying said mixture therefrom through the air ejector compartment, valves for controlling the flow of said mixture, joined external pipes for conducting the mixture to the main intercondenser, separate pipes for conducting the mixture therefrom, valves on said pipes for controlling flow therein, second stage main air ejectors for receiving said mixture and injecting it into the air ejector compartment, first stage auxiliary air ejectors for receiving auxiliary air and vapor mixture from the auxiliary condenser, parallel horizontal pipes for carrying said mixture through the air ejector compartment, valves for controlling the flow of said mixture, joined external pipes for conducting the mixture to the auxiliary intercondenser, diverging pipes for conducting said mixture therefrom, valves on said diverging pipes, a pair of second stage auxiliary air ejectors for receiving said mixture from said diverging pipes and injecting it into the air ejector compartment for commingling with the main mixture, a port for discharging the commingled mixture into the combined air ejector after condenser and gland leakoff condenser, a port for admitting air and vapor from the turbine glands to join the previously combined air and vapor mixtures, an outlet for discharging condensate and a separate outlet for discharging air and vapor from the combined air ejector after condenser and gland leakoff condenser.

5. In a multi-stage steam plant including main and auxiliary condensers, second stage deaerating feed heater, turbine glands and bleeder, and fresh water drain collecting tank, a low pressure feed heater unit comprising a unitary containing shell substantially rectangular in transverse section, a plurality of horizontal division plates forming in order from the bottom rectangular compartments in said shell comprising an auxiliary air ejector intercondenser, a main air ejector intercondenser, a feed heater drain cooler, a combined gland leakoff condenser and main and auxiliary after condenser, an air ejector compartment through which air and vapor pass to the combined gland leakoff condenser and main and auxiliary after condenser, and a first stage feed heater through which heating steam from the turbine bleeder passes to the feed heater drain cooler, a tubesheet secured at each open end of said shell, a plurality of straight horizontal tubes extending between said sheets and opening on the outside of said sheets for heat transference and passage of condensate, a return waterhead at one end of said tube sheets, an outlet water head at the other end of said tube sheets, an auxiliary inlet port at the bottom of the return water head for injecting condensate from the auxiliary condenser into the tubes in the auxiliary air ejector intercondenser, a main inlet port in the outlet water head for injecting condensate from the main condenser into the tubes in the main air ejector intercondenser and thence to the drain cooler, division walls in the water heads to direct flow of main and auxiliary condensate separately through their respective tubes, a vertical by-pass wall in the return water head to by-pass condensate from the auxiliary air ejector intercondenser to combine with condensate from the drain cooler at the entrance of the combined gland leakoff condenser and main and auxiliary air ejector section, a division wall in return water head to conduct the combined condensate through the said gland leakoff condenser and main and auxiliary air ejector section, an outlet for recirculating part of the combined condensate to the main or auxiliary condensers, thermostatic means for regulating the amount of condensate recirculated, the aforesaid first stage feed heater being adapted and arranged for heating the remaining condensate and discharging same.

EUGENE PORTER WORTHEN.